J. Bryant,
Scissors,
N°22,159.    Patented Nov.30, 1858.
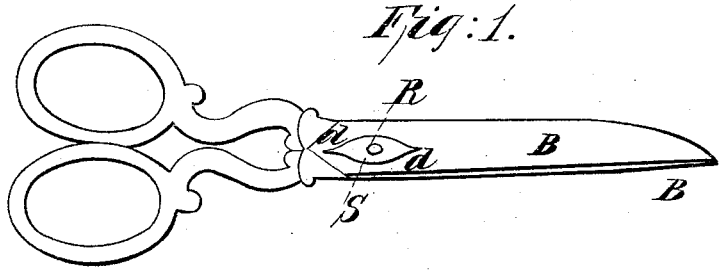
Fig:1.
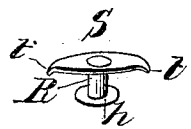
Fig:2.
Witnesses:    Inventor:
A.S. Whitman    Joel Bryant
J.T. Gairsher

UNITED STATES PATENT OFFICE.

JOEL BRYANT, OF BROOKLYN, NEW YORK.

SCISSORS.

Specification of Letters Patent No. 22,159, dated November 30, 1858.

*To all whom it may concern:*

Be it known that I, JOEL BRYANT, of Brooklyn, in the county of Kings and State of New York, have invented a new and Improved Mode of Constructing Scissors; and I hereby declare that the following is a full and correct description thereof, to wit:

The nature of my invention consists in the construction of scissors which are provided with a spring, or springs, connecting with the rivet, joint, and blades, so as to produce a uniform pressure upon the blades at whatever angle they cut, as also to obviate the results of wear, from use, by the contraction of the said spring, or springs, so as to prevent the blades of the said scissors from becoming loose or "shaky," so as to require "tightening"—like scissors secured at the joint by an inflexible rivet (as in common scissors) or as when the blades are bound together by firm and unyielding plates of metal, (as in the use of scissors made under John Allender's patent).

To enable others skilled in the art to make and use my invention, I will proceed more fully to describe the construction and operation of my improved scissors—reference being made to the accompanying drawings, and to the figures and letters marked thereon, as forming a part of this specification,—Figure 1 being a perspective view of my said scissors, in which letters B, B, designate the blades,—letter R the rivet, and letter S, the spring, which, in its connection and operation as hereinafter described, constitutes the improvement in my improved scissors. Fig. 2, shows the construction of the said spring S, as it appears when connected with the spring R, and disconnected from the blades B, B, upon which it is designed to act when set as shown in Fig. 1.

I construct my improved scissors Fig. 1, of any desirable shape or size, and of the usual material for making scissors. I provide the blades B, B, of my improved scissors Fig. 1, with a suitable sized rivet R, on one end of which I form a head $h$, and on the other end I set and secure the aforesaid spring S, which I make of strong elastic steel, or of other elastic metal suitable for the purpose, and I set and secure the said spring S, upon the end of the rivet R, which may be made to fasten and hold the said spring S, by riveting down its end, or by corresponding screw threads formed on the end of the said rivet R, and in the eye of the said springs S,—the said spring S, being provided at each end with short tips $t$, which, when the said spring S, is made and set as shown in Fig. 1, enters into certain small indentations $d$, $d$, and there remain so as to prevent the said spring S, from getting out of place or turning upon the blade upon which the ends of the said spring rests, so as to produce a firm and uniform pressure of the said blades B, B, upon each other binding them together, substantially as shown in Fig. 1.

It will be obvious, that when desirable two springs may be employed in the construction and use of my improved scissors, the two being constructed and set one to each blade substantially as the one spring S, is set, as shown in Fig. 1, the head $h$, of the rivet R, in such case forming a cap for the one spring on one side, and, if desirable, the rivet being made sufficiently long, a cap may be set on the end of the rivet for the spring on the other side of the scissors, and thus, as will be obvious, the said scissor blades B, B, will be more firmly and strongly bound together in this way, than when only provided with one spring: yet in small sized scissors (Fig. 1,) it is presumed that one spring S, will, when properly made and set, be sufficient for all practical purposes and general use.

The advantages obtained by this invention, in the use of my improved scissors (Fig. 1,) are—that, by the use of the said spring S—made and set substantially as above described—the blades B, B, of the said scissors are bound snugly and securely together, and with a uniform pressure in whatever position the blades may be, and that whatever wear there may be in the rivet (R,) and blades (B, B,) its results will be obviated by the contraction of the said spring S, (or by the two springs, whenever two springs are employed), so as thus to obviate the necessity for tightening the blades in the joint, as in the use of other sicssors, as the said spring S, effectually prevents the blades of my improved scissors (Fig. 1,) from ever becoming "shaky," or loose from wear in the joint-rivet, and blades: Consequently my improved scissors (Fig. 1,) will work easier—cut without gripping—retain their edge better, and other things being equal—will last longer in good condition, than any other scissors hitherto known or used.

I am aware that scissors have been made with rigid plates of metal vibrating upon their blades, for the purpose of holding and keeping the edges of the blades in contact with each other, as in John Allender's scissors: but I am not aware that scissors have ever been provided with springs in any way or manner for the purpose of forming a joint that will produce and retain a uniform pressure, preventing the necessity for tightening the blades, and obviate the result of wear from use, as herein described and set forth: consequently—disclaiming all other modes of constructing scissors—I desire to secure by Letters Patent what I hereby claim as my invention, to wit:

I claim—

The exclusive use of scissors when provided with a spring or springs connecting with the rivet and blades substantially as herein described and for the purposes set forth.

J. BRYANT.

Witnesses:
H. W. WHEELER,
A. G. WHITMAN.